(12) United States Patent
Mabu et al.

(10) Patent No.: US 10,666,120 B2
(45) Date of Patent: *May 26, 2020

(54) METHOD FOR INJECTING RESIN INTO LAMINATED IRON CORE

(71) Applicant: MITSUI HIGH-TEC, INC., Kitakyushu-shi, Fukuoka (JP)

(72) Inventors: Hirotoshi Mabu, Fukuoka (JP); Satoshi Matsubayashi, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 154 days.

This patent is subject to a terminal disclaimer.

(21) Appl. No.: 15/667,041

(22) Filed: Aug. 2, 2017

(65) Prior Publication Data

US 2018/0041101 A1 Feb. 8, 2018

(30) Foreign Application Priority Data

Aug. 4, 2016 (JP) ................. 2016-153577

(51) Int. Cl.
*H02K 15/00* (2006.01)
*H02K 15/14* (2006.01)
(Continued)

(52) U.S. Cl.
CPC ............. *H02K 15/03* (2013.01); *H02K 15/02* (2013.01); *H02K 15/12* (2013.01)

(58) Field of Classification Search
CPC .......... H02K 15/02; H02K 15/03; H02K 15/12
See application file for complete search history.

(56) References Cited

U.S. PATENT DOCUMENTS 6,294,411 B1 * 9/2001 Nishibayashi ........ H01L 21/565
257/E21.504
2001/0003385 A1 6/2001 Ise
(Continued)

FOREIGN PATENT DOCUMENTS

CN 1336711 A 2/2002
JP 5-309686 A 11/1993
(Continued)

OTHER PUBLICATIONS

China Official Action received in CN201710660964.2, dated Feb. 3, 2020.
(Continued)

*Primary Examiner* — Paul D Kim
(74) *Attorney, Agent, or Firm* — Greenblum & Bernstein, P.L.C.

(57) ABSTRACT

A method includes arranging and clamping a laminated iron core body between a receive unit and a mold unit that includes a resin pool part, the laminated iron core body including a plurality of laminated iron core pieces and a resin hole pierced in the lamination direction, with the laminated iron core body being clamped, extruding a resin of an inside of the resin pool part using a plunger and injecting the resin into the resin hole, after curing the resin in the resin hole, separating unwanted resin from the plunger by moving the plunger by a given distance in a direction away from the laminated iron core body before the laminated iron core body with unwanted resin is detached from the mold unit, and after separating the unwanted resin from the plunger, moving the plunger to the side of the laminated iron core body.

5 Claims, 3 Drawing Sheets

(51) Int. Cl.
*H02K 15/16* (2006.01)
*H02K 15/03* (2006.01)
*H02K 15/02* (2006.01)
*H02K 15/12* (2006.01)

(56) References Cited

U.S. PATENT DOCUMENTS

| | | |
|---|---|---|
| 2002/0047409 A1 | 4/2002 | Hiroyuki et al. |
| 2003/0151327 A1 | 8/2003 | Ramirez |
| 2005/0172829 A1 | 8/2005 | Shimatani et al. |
| 2007/0056961 A1 | 3/2007 | Shimatani et al. |
| 2018/0048220 A1* | 2/2018 | Mabu .................. B29C 45/03 |
| 2019/0089232 A1* | 3/2019 | Fukuyama ............... H02K 1/28 |

FOREIGN PATENT DOCUMENTS

| | | |
|---|---|---|
| JP | 10-199907 A | 7/1998 |
| JP | 2002-34187 | 1/2002 |
| JP | 2003-529309 | 9/2003 |
| JP | 2004-333102 A | 11/2004 |
| JP | 2013240202 A * | 11/2013 |
| JP | 2014036486 A * | 2/2014 |
| JP | 2015-23597 A | 2/2015 |

OTHER PUBLICATIONS

Japan Office Action issued in JP 2015-153577 and English language translation, dated Apr. 7, 2020.

* cited by examiner

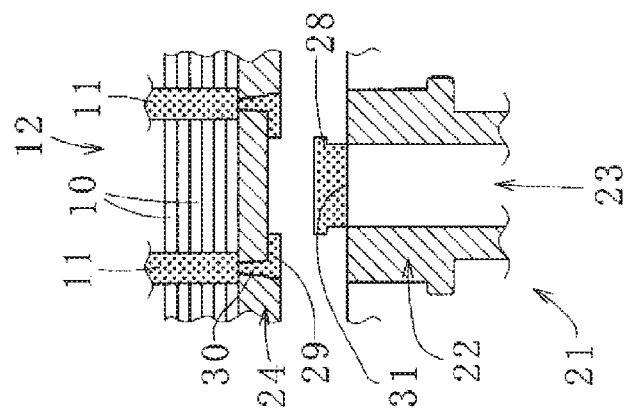

METHOD FOR INJECTING RESIN INTO LAMINATED IRON CORE

CROSS REFERENCE TO RELATED APPLICATION

This application is based upon and claims the benefit of priority of Japanese Patent Application No. 2016-153577 filed on Aug. 4, 2016, the contents of which are incorporated herein by reference in its entirety.

BACKGROUND OF THE INVENTION

1. Field of the Invention

The present invention relates to a method for injecting a resin into a laminated iron core constructed by laminating a plurality of iron core pieces.

2. Description of the Related Art

A laminated iron core constructed by laminating plurality of iron core pieces includes a stator iron core (or stator) or a rotor iron core (or rotor) formed with a resin hole pierced in a lamination direction.

The rotor iron core is formed with a hole part made of a resin hole pierced in an axial direction as described in, for example, JP-A-2002-34187 as Patent Literature 1, and a permanent magnet fitted into the hole part is fixed by using a resin with which the inside of the hole part is filled.

Also, the stator iron core is formed with an axial housing made of a resin hole along a height direction as described in, for example, JP-T-2003-529309 as Patent Literature 2, and a plurality of stacked thin metal sheets are fixed by curing a resin injected into the axial housing.

Patent Literature 1: JP-A-2002-34187
Patent Literature 2: JP-T-2003-529309

SUMMARY OF THE INVENTION

An unwanted resin sticking out of the resin hole in the cured resin is respectively adhered to the side of the laminated iron core and a mold unit for injecting the resin, and becomes resistant to remove the unwanted resin. As a result, cracks (fractures) tend to occur in the portion with the weakest strength in the resin sticking out of the resin hole when the laminated iron core is detached from the mold unit.

Consequently, there is a problem of requiring work of respectively removing the unwanted resin separated by the cracks from the mold unit and the laminated iron core.

The present invention has been implemented in view of such circumstances, and a non-limited object of the present invention is to provide a method for injecting a resin into a laminated iron core, capable of manufacturing the laminated iron core and improving workability of work of removing an unwanted resin without producing cracks in the resin.

There is provided, according to an aspect of the present invention, a method for injecting a resin into a laminated iron core, the method including:

arranging and clamping a laminated iron core body between a receive unit and a mold unit that includes a resin pool part, wherein the laminated iron core body includes a plurality of laminated iron core pieces and a resin hole pierced in the lamination direction inside the laminated iron core body;

with the laminated iron core body being clamped, extruding a resin of an inside of the resin pool part using a plunger and injecting the resin into the resin hole;

after curing the resin in the resin hole, separating unwanted resin from the plunger by moving the plunger by a given distance in a direction away from the laminated iron core body before the laminated iron core body together with the unwanted resin is detached from the mold unit; and after separating the unwanted resin from the plunger, moving the plunger to the side of the laminated iron core body.

In the method for injecting the resin into the laminated iron core according to the aspect of the present invention, unwanted resin (i.e., resin sticking out from the resin hole) is separated from the plunger by moving the plunger by a given distance in a direction away from the laminated iron core body before the laminated iron core body is detached from the mold unit, and after separating the unwanted resin from the plunger, the plunger is moved to the side of the laminated iron core body. Accordingly, cracks in the unwanted resin can be decreased and further prevented, and workability of work of removing the unwanted resin can be improved.

BRIEF DESCRIPTION OF THE DRAWINGS

In the accompanying drawings:

FIGS. 3A to 3D are explanatory diagrams of a method for injecting a resin into a laminated iron core according to a reference example.

DETAILED DESCRIPTION OF THE EXEMPLARY EMBODIMENTS

Figures 1A, 1B, 1C, 1D:
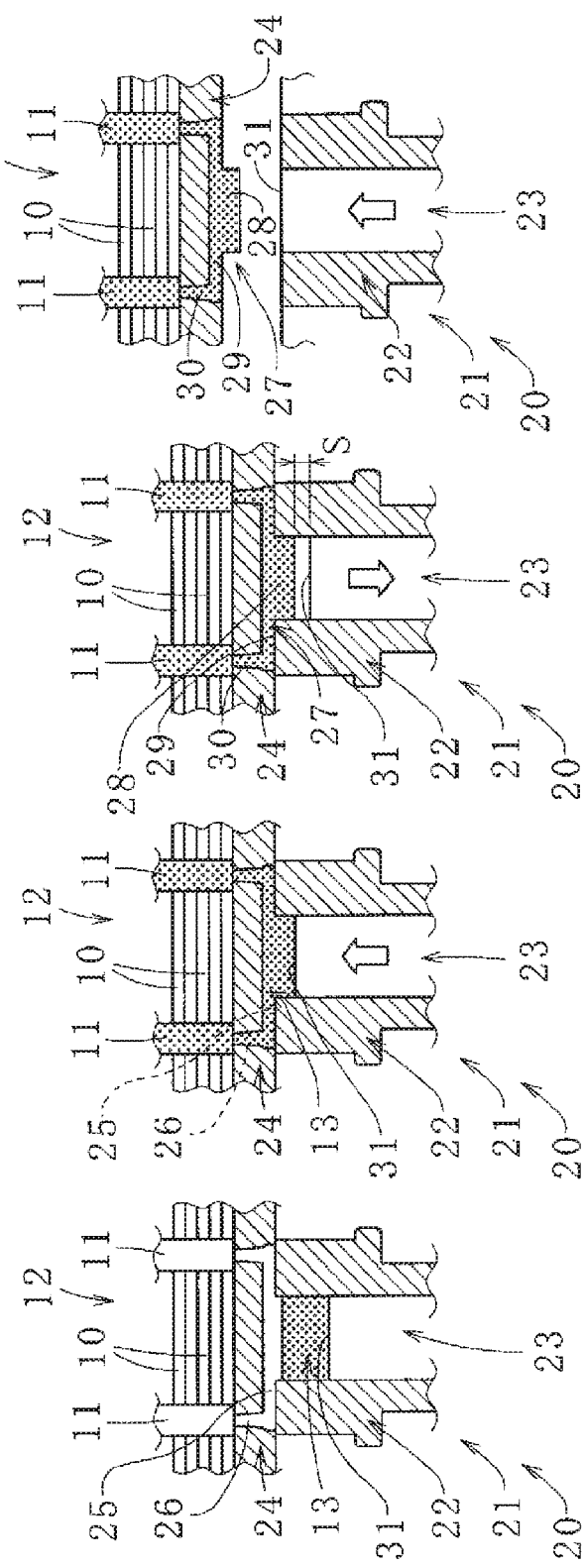
FIGS. 1A to 1D are explanatory diagrams of a method for injecting a resin using an apparatus for injecting the resin into a laminated iron core according to an embodiment of the present invention.

Subsequently, an embodiment of the present invention will be described with reference to the accompanying drawings, and the present invention will be understood.

First, a laminated iron core to which a method for injecting a resin into the laminated iron core according to an embodiment of the present invention is applied will be described, and then, the method for injecting the resin into the laminated iron core will be described.

As shown in FIGS. 1A to 1D, a laminated iron core has a laminated iron core body 12 constructed by laminating a plurality of annular iron core pieces 10 and inwardly formed with a resin hole 11 pierced in a lamination direction.

The iron core piece 10 is blanked and formed from a strip workpiece (thin metal sheet) made of, for example, an amorphous material or an electromagnetic steel plate with a thickness of about 0.10 to 0.5 mm. In addition, the iron ore piece 10 may be a piece blanked from one strip workpiece, or a piece blanked from a plurality (for example, two, or three or more) of stacked strip workpieces.

The iron core piece 10 has an annular integral structure, but may have a divided structure capable of annularly joining a plurality of circularly arcuate iron core piece parts, or a structure capable of connecting a part of the plurality of circularly arcuate iron core piece parts in a circumferential direction by a joining part and folding the joining part to be formed in an annular shape.

Also, the laminated iron core body may be formed by sequentially rotating and laminating a plurality of block iron cores formed by respectively laminating a plurality of annular iron core pieces. In addition, all of the plurality of block iron cores have the same shape, but, for example, a part of the block iron cores may have a different shape.

A rotor iron core which is one example of the laminated iron core has a laminated iron core body (that is, the laminated iron core body 12), and the iron core pieces (that is, the iron core pieces 10) adjacent in the lamination direction of the laminated iron core are mutually coupled using, for example, caulking, an adhesive or welding. In addition, the inside of this laminated iron core body is formed with a coupling hole (that is, the resin hole 11) pierced in the lamination direction, and this coupling hole is filled with a resin 13 and thereby, the iron core pieces adjacent in the lamination direction can also be mutually coupled. Also, in this coupling, any two or more of caulking, an adhesive, welding and a resin can be combined.

In addition, a laminated iron core constructed without using the coupling (that is, in a loose state) may be used. In this case, iron core pieces are placed on a cull plate 24 described below and are positioned, and the loose iron core pieces are integrated.

The center of the rotor iron core is formed with a shaft hole, and a plurality of magnet-insert holes (that is, the resin holes 11), for permanent magnets, pierced in the lamination direction are formed circumferentially around the shaft hole. The permanent magnet inserted into each of the magnet-insert holes is fixed by curing the resin 13 with which each of the magnet-insert holes is filled.

In addition, as the resin 13 with which the coupling hole or the magnet-insert hole described above is filled, a thermosetting resin (for example, an epoxy resin) or a thermoplastic resin can be used (the same applies hereinafter).

A stator iron core which is one example of the laminated iron core has a laminated iron core body (that is, the laminated iron core body 12), and the iron core pieces (that is, the iron core pieces 10) adjacent in the lamination direction of the laminated iron core are mutually coupled by filling a coupling hole (that is, the resin hole 11) pierced in the lamination direction with the resin 13. In this coupling, any one or two or more of caulking, an adhesive and welding can be further combined.

In addition, the plurality of coupling holes described above are formed in a circumferential direction of the stator iron core.

Also, the stator iron core is formed with a plurality of slots (magnetic pole parts) in the circumferential direction of the stator iron core.

Subsequently, a method for injecting the resin into the laminated iron core according to the embodiment of the present invention will be described with reference to FIGS. 1A to 1D and FIGS. 2A and 2B.

First, the plurality of iron core pieces 10 blanked from a strip workpiece using a die unit (not shown) are sequentially laminated to manufacture the laminated iron core body 12.

Here, when the laminated iron core is a rotor iron core, any one or two or more of the caulking, the welding and the resin described above can be used in coupling of the plurality of laminated iron core pieces (iron core pieces 10), but it is unnecessary to use the coupling. In addition, when the resin is used in the coupling, the coupling hole (resin hole 11) is formed in the lamination direction of the laminated iron core body (laminated iron core body 12).

Then, a non-magnetized permanent magnet (a magnetized permanent magnet may be used) is inserted into each of the magnet-insert holes (resin holes 11) of the laminated iron core body.

Also, when the laminated iron core is a stator iron core, the resin described above is used in coupling of the plurality of laminated iron core pieces (iron core pieces 10), with the result that the coupling hole (resin hole 11) is formed in the lamination direction of the laminated iron core body (laminated iron core body 12) as described above. In addition, any one or two or more of the caulking, the adhesive and the welding as well as the resin described above can be further combined in the coupling.

The laminated iron core body 12 described above is set in the mold device 20 (FIG. 1A).

The mold device 20 includes an upper mold (not shown) (one example of a receive unit) used as a pressing mold, and a lower mold (one example of a mold unit) 21 used as a resin injecting mold, the upper and lower molds pinching the laminated iron core body 12 from both sides in the lamination direction. The lower mold 21 is provided with a resin pool pot (one example of a resin pool part) 22, and the inside of this resin pool pot 22 is provided with a plunger 23 upwardly and downwardly movable by a driving source (for example, a cylinder or a jack).

In the case of use of the mold device 20, the laminated iron core body 12 is arranged on the lower mold 21 through the cull plate 24, and the upper mold is arranged on the laminated iron core body 12 (the laminated iron core body 12 is arranged between the lower mold 21 and the upper mold), and the laminated iron core body 12 is clamped (closed with the molds).

Then, with the laminated iron core body 12 clamped, the liquid resin 13 of the inside of the resin pool pot 22 is extruded by upwardly moving the plunger 23, and the resin 13 is injected into the resin hole 11 through the cull plate 24 and is cured (FIG. 1B).

This cull plate 24 is a jig (also called a conveyance tray or a core set plate) made of a metal (a stainless plate or a steel plate) capable of placing and conveying the laminated iron core body 12, and is respectively formed with a runner (a resin flow path) 25 opened toward a lower surface side, and a gate hole (a resin injection hole) 26 communicated to the runner 25 and opened toward an upper surface side. The runner may be formed in the lower mold 21 (for example, in a resin pool pot or a lower mold body, etc.) instead of being formed in the cull plate.

Since this gate hole 26 is formed in a position overlapping with the resin hole 11 in plan view, the resin 13 of the inside of the runner 25 can respectively be injected into the resin hole 11 through the gate hole 26.

In addition, the laminated iron core body 12 and the cull plate 24 described above are previously heated (preheated) to a resin injection temperature (for example, about 150 to 170° C.) according to a kind of used resin etc. This heating method is not particularly limited and, for example, gas (hot air) or a heater can be used.

Accordingly, fluidity of the resin 13 flowing through the laminated iron core body 12 and the cull plate 24 can be maintained to stably inject the resin 13.

Also, the laminated iron core body 12 described above may be preheated to a temperature (for example, 60 to 100° C.) lower than that of the cull plate 24. Accordingly preheating time of the laminated iron core body 12 can be shortened to improve productivity.

Further, the upper mold and the lower mold 21 can be respectively provided with heaters (heating means) for heating the laminated iron core body 12 pinched.

Figure 2A:
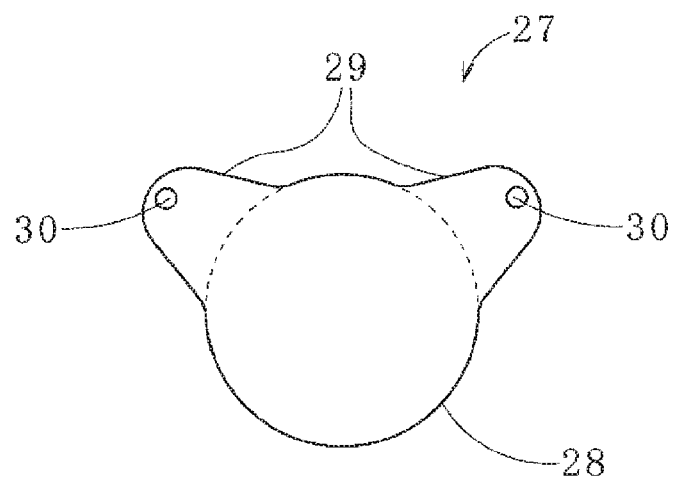
FIG. 2A is a plan view of an unwanted resin formed in the method for injecting the resin into the laminated iron core.

When the resin 13 is injected into the resin hole 11 of the laminated iron core body 12 through the cull plate 24 as described above, an unwanted resin 27 left and cured inside the resin pool pot 22, the runner 25 and the gate hole 26 of the cull plate 24 is formed as shown in FIG. 2A. This unwanted resin 27 is the resin excluding the resin injected into the resin hole 11 in the resin 13, and is formed, that is, by integrating a resin part 28 of the inside of the resin pool pot 22, a resin part 29 of the inside of the runner 25 and a resin part 30 of the inside of the gate hole 26 of the cull plate 24. After the unwanted resin 27 is recovered in a state adhering to the cull plate 24, the unwanted resin 27 is removed from the cull plate 24. In addition, the removed unwanted resin 27 may be, for example, discarded, or crushed and recycled.

Here, a method for injecting a resin into a laminated iron core according to a reference example will be described with reference to FIGS. 3A to 3D.

In the reference example, after a resin 13 is injected into a resin hole 11 of a laminated iron core body 12 and is cured (FIGS. 3A and 3B), a plunger 23 is further upwardly moved and is projected from an upper surface (a resin pool pot 22) of a lower mold 21 and also, a cull plate 24 is separated from the lower mold 21 and then, the plunger 23 is downwardly moved to the inside of the lower mold 21 (FIG. 3C).

Accordingly, the laminated iron core body 12 together with the cull plate 24 can be detached from the lower mold 21 (FIG. 3D).

However, since mirror processing (lapping) is performed on a surface 31 (here, an upper surface) of contact between the plunger 23 and the resin 13, the strength of close contact between the cured resin 13 and the contact surface 31 becomes high and also, a resin part 30 cured inside a gate hole 26 of the cull plate 24 is adhered to an inner surface of the gate hole 26 and becomes resistant to removing the resin.

As a result, when the plunger 23 is downwardly moved after the cull plate 24 is separated from the lower mold 21, cracks (fractures) tend to occur in a resin part 29, with the weakest strength, left inside the runner 25 of the cull plate 24 in the cured resin 13.

Accordingly, as shown in FIG. 3C, while a resin part 28 in close contact with the contact surface 31 of the plunger 23 in the cured resin 13 is downwardly moved together with the plunger 23, the resin part 30 of the inside of the gate hole 26 adheres to the cull plate 24 together with most of the resin part 29 located inside the runner 25.

When the resin part 28 is left on the contact surface 31 of the plunger 23 in this manner, for example, work of injecting the resin 13 in manufacturing equipment of the laminated iron core is stopped and a worker must remove the resin 13 from the plunger 23, with the result that there are problems of decreasing workability and productivity of the laminated iron core.

Hence, as described above, in the present embodiment, the plunger 23 is separated from the cured resin 13 (the resin part 28) by moving the plunger 23 in a downward direction (a direction away from the laminated iron core body 12) before the laminated iron core body 12 together with the cull plate 24 is detached from the lower mold 21 after the resin 13 injected into the resin hole 11 is cured (FIG. 1B) (FIG. 1C: that is, a step A).

Figure 2B:
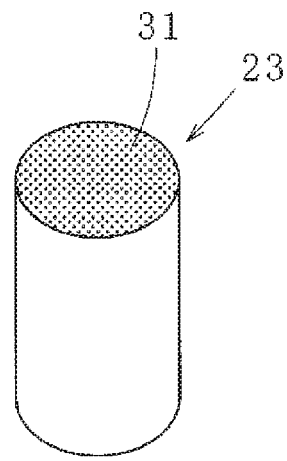
FIG. 2B is a perspective view of a plunger used for method for injecting the resin into the laminated iron core.

Here, satin processing is performed on the contact surface 31 between the plunger 23 and the resin part 28 as shown in FIG. 2B.

When the satin processing is performed on the contact surface 31 in this way surface roughness Rz of the contact surface 31 is preferably set in values from 3 μm to 15 μm (both inclusive) (more preferably, a lower limit is 9 μm and an upper limit is 11 μm). Accordingly separation of the plunger 23 from the resin part 28 becomes easier than the case where the satin processing is not performed on the contact surface, or the case where the surface roughness Rz of the contact surface is set in less than 3 μm or more than 15 μm.

In addition, the surface roughness Rz (ten-point average roughness) described above is defined in JIS B0601 (1994), and concretely means that only a reference length is extracted from a roughness curve in a direction of its average line and the sum of average values of absolute values of elevations (Tp) from the highest top to the fifth highest top and average values of absolute values of elevations (Yv) from the lowest bottom to the fifth lowest bottom measured in a direction of longitudinal magnification from the average line of this extracted portion is obtained and this value is expressed in micrometer (μm).

The satin processing described above can be performed on the contact surface 31 of the plunger 23 by performing electrical discharge machining. However, as long as the surface roughness Rz of the contact surface can be set in the above numerical range (range from 3 μm to 15 μm), the satin processing is not limited to the electrical discharge machining, and other processing methods, for example, blasting or etching can also be used. In addition, as long as the separation of the plunger 23 from the resin part 28 is easily performed, other processing may be used.

Accordingly, since it is unnecessary to apply a mold release agent etc., ingredients (impurities) of the mold release agent etc. can be prevented from being mixed in the resin.

In addition, a distance of downward movement of the plunger 23 in the case of downwardly moving the plunger 23 is not particularly limited as long as the plunger 23 can be separated from the resin part 28, but a gap S between the resin part 28 and the contact surface 31 is preferably set at 1 mm or less.

This is because when the upper mold and the lower mold 21 are used and the resin 13 is injected into the resin hole 11 and is cured, the inside of the resin pool pot 22 (the gap between the unwanted resin 27 and the contact surface 31) becomes a vacuum and therefore in a case where the plunger 23 is moved in a separate direction from the laminated iron core body 12, a force for moving in the movement direction of the plunger 23 may apply on the unwanted resin 27 and the cracks may occur.

Although the gap S between the resin part 28 and the contact surface 31 is set at 1 mm or less in order to certainly perform separation of the plunger 23 from the resin part 28 while preventing the cracks of the unwanted resin the gap S is preferably set at 0.7 mm or less, and more preferably at 0.5 mm or less.

On the other hand, the lower limit value of the gap S between the resin part 28 and the contact surface 31 is not especially set (more than 0 mm) as long as the plunger 23 is separated from the resin part 28, but it is preferably set at about 0.2 mm in order to certainly perform the separation of the plunger 23 from the resin part 28.

After the plunger 23 is separated from the resin part 28, the plunger 23 is upwardly moved (is moved to the side of the laminated iron core body 12: that is, a step B), and is projected from the inside of the resin pool pot 22 and also, the upper mold, the laminated iron core body 12 and the cull plate 24 are upwardly moved to a specific position and thereby, the cull plate 24 is separated from the lower mold 21. At this time, movements of the upper mold, the laminated iron core body 12 and the plunger 23 synchronize.

Thereafter, the upper mold is detached from the laminated iron core body 12 and also, the plunger 23 is downwardly moved to the inside of the lower mold 21.

Accordingly, the laminated iron core body 12, together with the cull plate 24 to which the unwanted resin 27 adheres, can be detached from the lower mold 21 (FIG. 1D).

As described above, before the laminated iron core body 12 is detached from the lower mold 21, the plunger 23 downwardly moved in order to be separated from the resin part 28 is again upwardly moved and thereby, the cracks in the unwanted resin 27 resulting from the vacuum of the inside of the resin pool pot 22 described above can be decreased and further prevented.

Then, the laminated iron core body 12, in which the resin 13 is injected into the resin hole 11 and is cured, is conveyed to the next step with the laminated iron core body 12 placed on the cull plate 24, and a predetermined step is performed and then, the cull plate 24 is detached and the laminated iron core body 12 is used.

Also, in the cull plate 24 detached from the laminated iron core body 12, a bar material etc. are inserted into the gate hole 26 and the unwanted resin 27 is removed and thereafter, the cull plate 24 is repeatedly used for conveyance of a different laminated iron core body 12, and the method for injecting the resin described above is sequentially performed with respect to this laminated iron core body 12.

From the above, use of the method for injecting the resin into the laminated iron core of the embodiments of the present invention can manufacture the laminated iron core with the unwanted resin adhering to only the cull plate (without adhering to the lower mold) without producing the cracks in the unwanted resin.

In summary an aspect of the present invention provides a method for injecting a resin into a laminated iron core, the method including:

arranging and clamping a laminated iron core body between a receive unit and a mold unit that includes a resin pool part, wherein the laminated iron core body includes a plurality of laminated iron core pieces and a resin hole pierced in the lamination direction inside the laminated iron core pieces;

with the laminated iron core body being clamped, extruding a resin of an inside of the resin pool part using a plunger and injecting the resin into the resin hole;

after curing the resin in the resin hole, separating unwanted resin from the plunger by moving the plunger by a given distance in a direction away from the laminated iron core body before the laminated iron core body together with the unwanted resin is detached from the mold unit; and after separating the unwanted resin from the plunger, moving the plunger to the side of the laminated iron core body.

The method for injecting the resin into the laminated iron core according to the aspect of the present invention may further includes: arranging a cull plate between the laminated iron core body and the mold unit, wherein the cull plate includes a resin flow path and a gate hole communicated to the resin flow path, wherein after injecting the resin from the resin pool part into the resin hole through the resin flow path and the gate hole of the cull plate and curing the resin in the resin hole, the laminated iron core body is detached from the mold unit together with the cull plate to which the unwanted resin is adhered.

The method for injecting the resin into the laminated iron core according to the aspect of the present invention may be configured such that a satin processing is performed on a contact surface with the resin of the plunger.

Surface roughness Rz of the contact surface may be set in values from 3 μm to 15 μm, both inclusive.

The method for injecting the resin into the laminated iron core according to the aspect of the present invention may be configured such that a gap between the unwanted resin and the contact surface is set at 1 mm or less when the plunger is moved in the direction away from the laminated iron core body.

The present invention has been described above with reference to the concrete embodiment, but the present invention is not limited to the configurations described in the embodiments described above, and also includes other embodiments and modified examples contemplated within the scope of the matter described in the claims. For example, the case of constructing the method for injecting the resin into the laminated iron core of the present invention by combining a part or all of the respective embodiments and the modified examples described above is also included in the scope of right of the present invention.

The embodiment described above describes the case of injecting the resin into the resin hole from the resin pool part formed in the lower mold (the case of injecting the resin from the downward side of the laminated iron core body), but the resin can also be injected into the resin hole from a resin pool part formed in the upper mold (the resin is injected from the upward side of the laminated iron core body). In this case, the plunger is moved in a direction opposite to that of the embodiments described above. Concretely, before the cull plate is detached from the mold unit (the upper mold) after the resin into the inside of the resin hole is cured, the plunger is upwardly moved and then, the plunger is again downwardly moved.

The embodiment described above describes the case of injecting the resin into the resin hole from the lower mold while arranging the cull plate between the laminated iron core body and the lower mold, but the cull plate can be arranged between the laminated iron core body and the upper mold and the resin can be injected into the resin hole from the upper mold. When the resin is injected in to the resin hole from the upper mold, the resin can be directly injected into the resin hole from the upper mold without using a cull plate. In this case, the upper mold is formed with a runner and a gate hole.

In addition, the resin may be injected into the resin hole at once for the whole laminated iron core body and also, the resin may be injected into each of the resin holes sequentially while rotating the laminated iron core body at a preset angle.

And, in the case of injecting the resin into the resin hole, by variously changing a position of formation of the runner and the gate hole for communicating the resin pool part to the resin hole, the resin can be injected from one plunger (resin pool part) to a plurality of resin holes, but the resin can also be injected from one plunger to one resin hole.

In addition, the embodiment described above describes the case of performing the satin processing on the contact surface of the plunger, but, a plunger having a contact surface on which mirror processing is performed (without satin processing) may be used depending on, for example, an area of the contact surface of the plunger, kinds (strength) of the using resin or the shape of the cured resin (the shape of the runner part).

Reference signs and numerals corresponding to some elements of the embodiment are listed as below.

10: IRON CORE PIECE
11: RESIN HOLE
12: LAMINATED IRON CORE BODY
13: RESIN
20: MOLD DEVICE
21: LOWER MOLD (MOLD UNIT)
22: RESIN POOL POT (RESIN POOL PART)
23: PLUNGER
24: CULL PLATE
25: RUNNER
26: GATE HOLE
27: UNWANTED RESIN
28, 29, 30: RESIN PART
31: CONTACT SURFACE

What is claimed is:

1. A method for injecting a resin into a laminated iron core, the method comprising:
   arranging and clamping a laminated iron core body between a receive unit and a mold unit that includes a resin pool part, wherein the laminated iron core body includes a plurality of laminated iron core pieces and a resin hole pierced in a lamination direction inside the laminated iron core body;
   with the laminated iron core body being clamped, extruding the resin of an inside of the resin pool part using a plunger and injecting the resin into the resin hole;
   after curing the resin in the resin hole, separating unwanted resin from the plunger by moving the plunger by a given distance in a direction away from an oppositely facing surface of the laminated iron core body before the laminated iron core body together with the unwanted resin is detached from the mold unit; and
   after separating the unwanted resin from the plunger, moving the plunger in a direction toward the oppositely facing surface of the laminated iron core body.

2. The method for injecting the resin into the laminated iron core according to claim 1, further comprising:
   arranging a cull plate between the laminated iron core body and the mold unit, wherein the cull plate includes a resin flow path and a gate hole communicated to the resin flow path, wherein
   after injecting the resin from the resin pool part into the resin hole through the resin flow path and the gate hole of the cull plate and curing the resin in the resin hole, the laminated iron core body is detached from the mold unit together with the cull plate to which the unwanted resin is adhered.

3. The method for injecting the resin into the laminated iron core according to claim 1, wherein a satin processing is performed on a contact surface of the plunger.

4. The method for injecting the resin into the laminated iron core according to claim 3, wherein a surface roughness Rz of the contact surface is set in values from equal to or greater than 3 µm to equal to or less than 15 µm.

5. The method for injecting the resin into the laminated iron core according to claim 1, wherein a gap between the unwanted resin and a contact surface of the plunger is set at 1 mm or less when the plunger is moved in the direction away from the laminated iron core body.

* * * * *